United States Patent
Mummadi et al.

(10) Patent No.: US 12,340,572 B2
(45) Date of Patent: Jun. 24, 2025

(54) DEVICE AND METHOD TO ADAPT A PRETRAINED MACHINE LEARNING SYSTEM TO TARGET DATA THAT HAS DIFFERENT DISTRIBUTION THAN THE TRAINING DATA WITHOUT THE NECESSITY OF HUMAN ANNOTATIONS ON TARGET DATA

(71) Applicant: Robert Bosch GmbH, Stuttgart (DE)

(72) Inventors: Chaithanya Kumar Mummadi, Pittsburgh, PA (US); Evgeny Levinkov, Stuttgart (DE); Jan Hendrik Metzen, Boeblingen (DE); Kilian Rambach, Stuttgart (DE); Robin Hutmacher, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 445 days.

(21) Appl. No.: 17/747,361

(22) Filed: May 18, 2022

(65) Prior Publication Data
US 2022/0406046 A1    Dec. 22, 2022

(30) Foreign Application Priority Data
Jun. 16, 2021 (EP) ..................... 21179755

(51) Int. Cl.
   *G06V 10/00* (2022.01)
   *G06V 10/764* (2022.01)
   *G06V 10/82* (2022.01)

(52) U.S. Cl.
   CPC ............ *G06V 10/82* (2022.01); *G06V 10/764* (2022.01)

(58) Field of Classification Search
   CPC .......... G06N 3/045; G06N 3/08; G06N 3/088; G06N 20/00; G06N 3/0895; G06V 10/82; G06V 10/764; G06T 2207/20081; G06T 2207/20084
See application file for complete search history.

(56) References Cited

U.S. PATENT DOCUMENTS

| | | | |
|---|---|---|---|
| 2020/0125982 A1* | 4/2020 | Gabourie | G06N 7/01 |
| 2020/0134424 A1* | 4/2020 | Chen | G06N 3/084 |
| 2020/0183035 A1* | 6/2020 | Liu | G06N 20/00 |
| 2021/0312674 A1* | 10/2021 | Abrol | G06N 3/088 |
| 2022/0101101 A1* | 3/2022 | Mathur | G06N 3/045 |
| 2024/0185555 A1* | 6/2024 | Chen | G06V 10/764 |

OTHER PUBLICATIONS

Farahani, Abolfazl, et al. "A brief review of domain adaptation." Advances in data science and information engineering: proceedings from ICDATA 2020 and IKE 2020 (2021): 877-894.*

(Continued)

*Primary Examiner* — Li Liu
(74) *Attorney, Agent, or Firm* — NORTON ROSE FULBRIGHT US LLP

(57) ABSTRACT

A computer-implemented method for adapting a pretrained machine learning system, which has been trained on a first training data set, to a second dataset, wherein the second dataset has different characteristics than the first data set. An input transformation module for partly undoing the distribution shift between the first and second training data set is provided.

10 Claims, 9 Drawing Sheets

(56) References Cited

OTHER PUBLICATIONS

Kouw, Wouter M., and Marco Loog. "A review of domain adaptation without target labels." IEEE transactions on pattern analysis and machine intelligence 43.3 (2019): 766-785.*

Tuia, Devis, Claudio Persello, and Lorenzo Bruzzone. "Domain adaptation for the classification of remote sensing data: An overview of recent advances." IEEE geoscience and remote sensing magazine 4.2 (2016): 41-57.*

Wang et al. "Fully test-time adaptation by entropy minimization." arXiv preprint arXiv:2006.10726 (2020). Retrived from the Internet on May 17, 2022: https://arxiv.org/abs/2006.10726. 15 Pages.

Roshni Sahoo et al: "Unsupervised Domain Adaptation in the Absence of Source Data", arxiv.org, Cornell University Library, 201 Olin Library Cornell University Ithaca, NY 14853, Jul. 20, 2020. 9 Pages.

Jian Liang et al: "Source Data-absent Unsupervised Domain Adaptation through Hypothesis Transfer and Labeling Transfer", arxiv.org, Cornell University Library, 201 Olin Library Cornell University Ithaca, NY 14853, Jun. 1, 2021. 16 Pages.

* cited by examiner

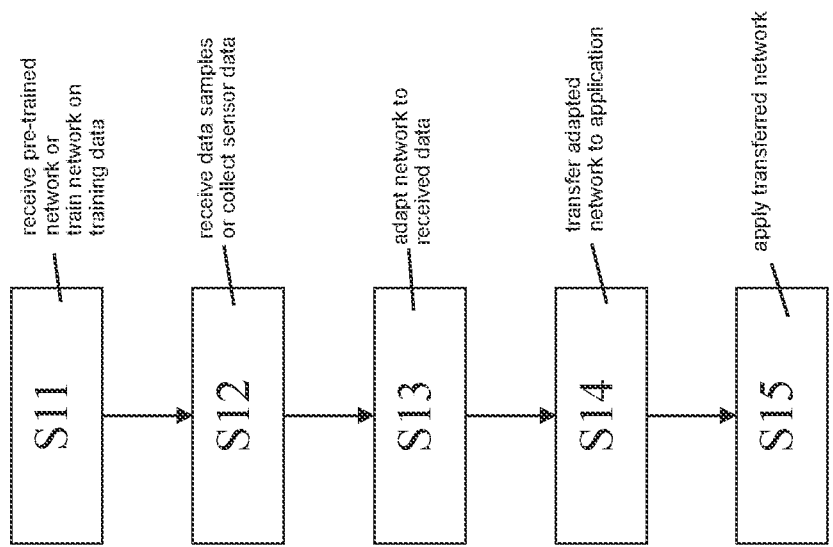

DEVICE AND METHOD TO ADAPT A PRETRAINED MACHINE LEARNING SYSTEM TO TARGET DATA THAT HAS DIFFERENT DISTRIBUTION THAN THE TRAINING DATA WITHOUT THE NECESSITY OF HUMAN ANNOTATIONS ON TARGET DATA

CROSS REFERENCE

The present application claims the benefit under 35 U.S.C. § 119 of European patent Application No. EP 21 17 9755.0 filed on Jun. 16, 2021, which is expressly incorporated herein by reference in its entirety.

FIELD

The present invention concerns a method for adapting a pretrained machine learning system, which has been trained on a first training data set, to a second dataset, and a method for operating an actuator, a computer program and a machine-readable storage medium, a classifier, a control system, and a training system.

BACKGROUND INFORMATION

Deep neural networks often exhibit poor performance on data distributions that differ from the train-time data distribution. Previous works demonstrate that test-time adaptation to data shift, e.g., using entropy minimization, effectively improves performance on shifted distributions, see for example: Wang et al. "Fully test-time adaptation by entropy minimization." arXiv preprint arXiv:2006.10726 (2020), online available: https://arxiv.org/abs/2006.10726.

ROSHNI SAHOO ET AL: "Unsupervised Domain Adaptation in the Absence of Source Data", ARXIV.org, CORNELL UNIVERSITY LIBRARY, 201 OLIN LIBRARY CORNELL UNIVERSITY ITHACA, NY 14853, 20 Jul. 2020, propose an unsupervised method for adapting a source classifier to a target domain that varies from the source domain along natural axes, such as brightness and contrast.

JIAN LIANG ET AL: "Source Data-absent Unsupervised Domain Adaptation through Hypothesis Transfer and Labeling Transfer", ARXIV.org, CORNELL UNIVERSITY LIBRARY, 201 OLIN LIBRARY CORNELL UNIVERSITY ITHACA, NY 14853, 1 Jun. 2021, propose an approach called Source HypOthesis Transfer (SHOT), which learns the feature extraction module for the target domain by fitting the target data features to the frozen source classification module (representing classification hypothesis). Specifically, SHOT exploits both information maximization and self-supervised learning for the feature extraction module learning to ensure the target features are implicitly aligned with the features of unseen source data via the same hypothesis.

SUMMARY

Robustness to domain shifts (out-of-distribution generalization) becomes increasingly important as more and more such machine learning models are deployed in the real world, which often turns out to be considerably different from the data set used for training these models. Therefore, it is important to provide machine learning models with means to adapt to possible changes in data distribution, many of which cannot be foreseen in advance.

The present invention focuses on fully test-time adaptation setting, where only unlabeled data from the target distribution is required. This allows adapting arbitrary pretrained networks. More precisely, a novel loss is provided that improves test-time adaptation by addressing premature convergence and instability of entropy minimization. In accordance with an example embodiment of the present invention, this is achieved by replacing the entropy by a non-saturating surrogate and adding a diversity regularizer based on batch-wise entropy maximization that prevents convergence to trivial collapsed solutions.

Furthermore, in accordance with an example embodiment of the present invention, a model augmentation is provided that prepends an input transformation module to the network that can partially undo test-time distribution shifts. Surprisingly, this preprocessing can be learned based solely on the fully test-time adaptation loss in an end-to-end fashion without any target domain labels or source domain data.

These adaptions have the advantage that the robustness of pretrained image classifiers to common corruptions is improved and a drop of the classification accuracy can be restored with very little effort, e.g. only retraining selected parameters by a few epochs. Since only unlabeled data of the target distribution is required, only data of the target distribution has to be collected and no labeling is required.

In a first aspect of the present invention, a computer-implemented method is provided for adapting a pretrained machine learning system to a second dataset. Under pretrained can be understood that the machine learning system has been trained until a change of its parameters was relatively low (e.g. smaller than a predefined threshold) and/or a convergence behavior has been present (e.g. change of the loss was lower than a predefined threshold for the loss). The pretrained machine learning system has been trained on a first training data set. The first training data set stems from a source training data distribution and the second data set stems from a target training data distribution.

The second dataset has different characteristics than the first data set. The source training data distribution differs from the target data distribution in that it characterizes the same objects, but the general occurrence of the objects and/or samples is different. The different characteristics can be given by augmentations of the samples of the first data set. Preferably, the possible labels of the first and second dataset are identical. More precisely, the same objects represented in the first training data are also represented in the second training data set. However, they may occur slightly modified, e.g. corrupted with noise or changed orientations or other characteristics are changed. It can be said that all modifications can be applied the images from the source distribution to obtain the second training data such that the characteristics of the objects are preserved, e.g. contours. Said modifications can be common corruptions like potentially stochastic image transformations motivated by real-world effects, e.g., that can be used for evaluating the model's robustness. For example, simulated corruptions such as noise, blur, weather effects, and digital image transformations, or even adversarial noise distributions. Or mixtures of data augmentations are also possible. Practically, the second dataset can be obtained by recoding sensor values with e.g. different sensor setting and/or different construction of the sensor configuration/arrangement.

In accordance with an example embodiment of the present invention, the method for adapting the pertained machine learning system comprises the following steps:

a. Receiving a plurality of samples from the second dataset. Interestingly, these samples are must not be necessarily labeled.
b. Estimating a first distribution $p_D(y)$ of an occurrence of expected labels of the received samples. The labels can be understood in a way that they characterize classes contained in the dataset. The expected labels can be the same labels of the first dataset. It is assumed for many realistic settings that the prior knowledge of $p_D(y)$ is availabl, e.g. a uniform distribution over the classes. The purpose of defining the distribution $p_D(y)$ is to avoid collapsed solutions i.e., collapsing to too narrow distributions such as always predicting the same or very few classes.
c. Determining outputs for each sample of a subset of the received samples.
d. Estimating a second distribution $\hat{p}_g(y)$ of labels depending on the occurrence of the determined outputs of the machine learning system. This distribution is obtained from the distribution of (soft) predictions from the machine learning system on the second dataset.
e. Determining a first loss function $L_{div}$ which charachterizes a divergence between the first distribution $p_D(y)$ and second distribution $\hat{p}_g(y)$, wherein the first loss function $L_{div}$ depends on the parameters of the pretrained machine learning system.
f. Adjusting parameters of the machine learning such that the first loss $L_{div}$ decreases. It is noted that the step of reducing the loss function for adjusting parameters can be also carried out by increasing the loss function, if the loss function is negatively defined.

In general, self-supervision by confidence maximization can lead to collapsed trivial solutions, which make the network to predict only a single or a set of classes independent of the input samples. To overcome this issue, only the first loss function can be used. It encourages the network to make different class predictions on different samples. It can be shown that this stabilizes the adaptation of the network to the unlabeled test samples. More precisely, it prevents the machine learning system from collapsing to trivial solutions by promoting diversity in the network prediction and to avoid collapse to trivial, high confidence solutions.

In accordance with an example embodiment of the present invention, it is provided that the divergence of the first loss function $L_{div}$ is a Kullback-Leibler divergence between the first and second distribution $(\hat{p}_g(y), p_D(y))$. The advantage of using KL divergence is that it measures how much the second distribution $(\hat{p}_g(y))$ is away from the true distribution $(p_D(y))$. Lowering the measure match the distribution $\hat{p}_g(y)$ with the true distribution $p_D(y)$.

Furthermore, in accordance with an example embodiment of the present invention, it is provided that the second distribution is iteratively determined by a moving average over the outputs determined so far. This can be understood in a way that the second distribution is determined by a moving average over all outputs determined for the current subset of samples or over all previously determined outputs for the received samples.

Furthermore, in accordance with an example embodiment of the present invention, it is provided that the steps c.-f. above are repeatedly carried out. For each repetition the subset of the received data samples is reassembled (e.g. by draw with put back from the received samples, or otherwise), wherein the second distribution $\hat{p}_g(y)$ is additionlly determined depending on a previously deteremined second distribution $(p_{t-1}(y))$, which has been determined in a (immediately carried out) previous repetition of the steps c.-f., which has been determined for a previously in particular different subset of received samples, wherein the second distribution $\hat{p}_g(y)$ and deteremined previous second distribution $(p_{t-1}(y))$, are weightend together. It is noted that said repetition of the steps c.-f. can be repeated for several epochs.

Furthermore, in accordance with an example embodiment of the present invention, it is provided that the previous second distribution $(p_{t-1}(y))$ is weighted more strongly than the second distribution $\hat{p}_g(y)$ by the moving average over the current subset of received samples.

Furthermore, in accordance with an example embodiment of the present invention, it is provided that the first distribution is essentially a uniform distribution of the occurrence of classes of the first training data. The first distribution should be fixed before adapting the machine learning system. The choice of this distribution is assumed to be known based on prior knowledge of the second dataset.

In a second aspect of the present invention, a second loss function $(L_{conf})$ is proposed as an alternative or supplement for the first loss function of the first aspect of the present invention. The second loss function characterizes a (negative) log-likelihood ratio between the outputs of the pretrained machine learning system and pseudo labels. The pseudo labels are estimated depending on the outputs of the machine learning system for the current subset of received samples, wherein the parameters of the pretrained machine learning system are adjusted either to decrease the first or second loss function or to decease both the first and second loss function. If a combination of both loss functions is used, preferably both loss functions are combined weighted, wherein the first loss function is weighted more strongly than the second loss function.

In accordance with an example embodiment of the present invention, it is explicitly provided to use a log-likelihood ratio to overcome the drawback of the commonly used entropy minimization, where high confidence predictions do not contribute to the loss significantly anymore, since these predictions provide only vanishing gradients for high confidence predictions. The proposed loss function of the second aspect has the advantage of non-saturating losses with respect to gradients based on the negative log likelihood ratio, such that gradients from high confidence self-supervision still contribute to test-time adaptation. It has been shown that using the first and/or second loss function, it is possible to improve the network performance under data shifts in fully test-time adaptation. An advantage of combining the first and second loss function is that it can be shown that only 5 epochs of after training are required to sufficiently adapt the model.

In accordance with an example embodiment of the present invention, it is provided that the pseudo labels are an onehot-encoding of the outputs of the machine learning system or the pseudo labels are exactly the outputs of the machine learning system. Thereby, no labels of the received samples are required. Alternatively, if ground truth label are present, they can also be used in place of the pseudo labels. Thereby, it is possible to integrate into the label-free approach some labels.

In a third aspect of the present invention, a computer implemented augmented machine learning system is provided, wherein an output of a parameterized input transformation module is connected with the input of a pretrained machine learning system, which is configured or more specifically, trained for classifying images, wherein the input transformation module is configured to at least linearly transform its input, and further configured to input its transformed input to the pretrained machine learning system.

In accordance with an example embodiment of the present invention, it is provided that the input transformation module is configured to at least partially undo a domain shift of its inputs such that its outputs comes relatively close to the originally inputs of the training data distribution on which the pretrained machine learning system has been trained.

Preferably, this module is trained in a fully test-time adaptation manner using the proposed loss functions of the first and/or second aspect of the present invention, i.e., without the need of any target domain labels or source data. It aims to partially undo the data shift at hand. This helps to further improve the performance on challenging image classification benchmark with common corruptions. Furthermore, this reduces the amount of adaptions of the pretrained model.

Furthermore, in accordance with an example embodiment of the present invention, it is provided that the input transformation module comprises a further machine learning system ($r_\psi$) which is connected in series with an a linear transformation module, wherein the further machine learning system ($r_\psi$) is configured to non-linearly transform the input of the input transformation module, wherein linear transformation module is configured to linearly transform the its input depending on parameters ($\gamma, \beta$) charachtierzing a linear transformation. Said parameters ($\gamma, \beta$) can for example charachterize an offset, a scaling, or shift or roation, etc.

Furthermore, in accordance with an example embodiment of the present invention, it is provided that between the further machine learning system ($r_\psi$) and the a linear transformation module, an addition module is interconnected, wherein the addition module comprises at least two inputs, wherein a first input is configured to receive outputs of the further machine learning system ($r_\psi$) and a second input which is configured to reveice the input of the input transformation module, wherein the addition module is configured to weighted sum its inputs and output the sum to the linear transformation module.

Furthermore, in accordance with an example embodiment of the present invention, it is provided that the output of the input transformation module has the same dimensions/shape as the input of the input transformation module.

Furthermore, in accordance with an example embodiment of the present invention, it is provided that the further machine learning system is a neural network, which comprises at least a convolution layer, a normalization layer and layer with ReLU's.

In a fourth aspect of the present invention, a computer implemented method for parametrizing the input transformation module is provided. In accordance with an example embodiment of the present invention, the method comprises the steps of: Receiving the pretrained machine learning system and a plurality of samples from the second dataset. Subsequently, connecting the output transformation module output with the input of the pretrained machine learning system. During inference of the connected input transformation module and the maschine learning system, an input of the input transformation module is then propagatred from the input of the input transformation module through the input transformation module and through the pretrained machine learning system to the output of the pretrained machine leairning system.

After the step of connecting, it follows a determining the first and/or second loss function of the first/second aspect of the present invention as well as adjusting at least parameters of the input transformation module according to the first/second aspect of the present invention.

Furthermore, in accordance with an example embodiment of the present invention, it is provided that the parameters of the input transformation module is initialized in such a way that the input transformation module carries out an identity mapping of its input for the pretrained machine learning system.

Furthermore, in accordance with an example embodiment of the present invention, it is provided that during adaption of the parameters according to any of the preceding aspects of the present invention, affine parameters of normalization layers of the pretrained machine learning system are adapted.

Furthermore, in accordance with an example embodiment of the present invention, it is provided that the parameters of the pretrained machine learning system are adjusted depending on determined gradients of the first and or second loss function with respect to said parameters.

For each of the aspects above, in accordance with an example embodiment of the present invention, it is provided that the machine learning system is a classifier for classifying input signals obtained from an imaging sensor.

For each of the aspects above, in accordance with an example embodiment of the present invention, it is provided that the machine learning system is a neural network ($f_\Theta$) comprising at least a normalization layer, wherein only channel wise affine parameters of normalization layers in the network are adapted. If the pretrained network originally does not comprise such layer, it is possible to add it before carrying out the adaption.

In a further aspect of the present invention, a computer-implemented method for using the classifier for classifying sensor signals is provided. Said classifier is adapted with the method according to any one of the preceding aspects of the present inventions, comprising the steps of: receiving a sensor signal comprising data from the imagining sensor, determining an input signal which depends on said sensor signal, and feeding said input signal into said classifier to obtain an output signal that characterizes a classification of said input signal.

In a further aspect of the present invention, a computer-implemented method for using the classifier trained with the method according to any one of preceding aspects for providing an actuator control signal for controlling an actuator. Determining an actuator control signal depending on an output signal of the classificatory, which can be determined as described by the previous section. It is proposed that the actuator controls at least a partially autonomous robot and/or a manufacturing machine and/or an access control system.

In a further aspect of the present invention, a control system for operating the actuator is provided. Said control system comprising the classifier adapted according to any of the preceding aspects of the present invention and being configured to operate said actuator in accordance with an output of said classifier.

Said classifier, e.g., a neural network, may be endowed with such structure that it is trainable to identify and distinguish e.g., pedestrians and/or vehicles and/or road signs and/or traffic lights and/or road surfaces and/or human faces and/or medical anomalies in imaging sensor images. Alternatively, said classifier, e.g., a neural network, may be endowed with such structure that is trainable to identify spoken commands in audio sensor signals.

It is noted that all aspects of the present invention can be utilized for a test-time adaptation. This scenario considers the setting, when training (source) data is unavailable at test-time. For example, when a car with a built-in road segmentation model is sold to customers. It is impossible to predict in which adverse conditions such a car will be used, but the segmentation model must be able to adapt in order to carry out its job. For this purpose, multiple unlabeled examples of available corruptions can be used for unsupervised data shift adaptation. However, the present invention can be also used during training. For example, if the model performs poorly on some validation data, it is possible to adjust the pretrained model on these data by the present invention, wherein the examples of the validation data can be seen as the target distribution.

Example embodiments of the present invention will be discussed with reference to the following figures in more detail.

FIG. 1 shows a flow chart for adjusting a pretrained machine learning system, in accordance with an example embodiment of the present invention.

DETAILED DESCRIPTION OF EXAMPLE EMBODIMENTS

Figure 2B:
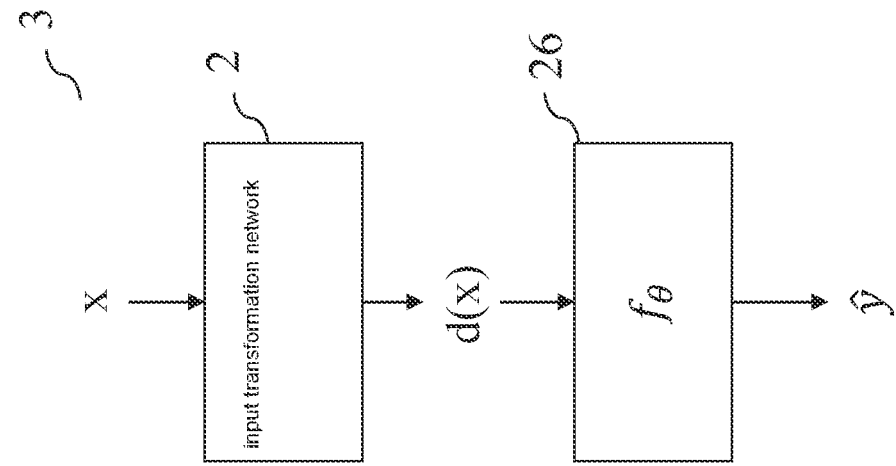
FIGS. 2A and 2B show an input transformation module for the pretrained machine learning system, in accordance with an example embodiment of the present invention.

Given a machine learning system, in particular a neural network, which has been pretrained on a source dataset for a given task (e.g. ImageNet object classification or object detection or semantic image segmentation), in the following several embodiments are proposed to adapt said machine learning system to the test dataset using the present invention without human annotations. The distribution of the test dataset (seen or unseen) remain unknown during the adaptation and is referred in the following to as target distribution.

Preferably, the machine learning system is adapted to the test data in a mini-batch setting for a given number N of epochs (surprisingly, N can be small, e.g. N∈[1;5]). In order to adapt to the new test data distribution, the machine learning system parameters are reused from a previous training on the source dataset. In each mini-batch, a batch of test samples are provided as input to the machine learning system and the channel wise affine parameters of normalization layers in the machine learning system can be adapted using the proposed self-supervised loss and/or adapting parameters of an input transformation module.

Upon adaptation for N epochs, the machine learning system can be used for testing purposes on the same adapted data or unseen data from the same test distribution.

To adapt the pretrained machine learning system on the target distribution of the training data/test data, several embodiments are discussed in the following. The embodiments can be grouped into a first general approach by using specifically designed loss functions to train in an unsupervised fashion the pretrained machine learning system and a second approach by connecting in front and in series to the pretrained machine learning system an input transformation module. It is noted that the several embodiments can be used separately or in any combination with each other. In the following, the machine learning system is exemplarily a pretrained neural network, hereinafter also referred to as pretrained network.

The first embodiment relates to a first loss function, which can be called 'Class Distribution Matching' loss function. The first loss function is characterized by the property that said loss function encourages predictions of the pretrained network over the adaptation dataset X that match a target distribution $p_{D'}(y)$, wherein X are (unlabeled) samples from the target distribution D' and the source distribution D of the training data of the pretraind network. It is noted that the two distributions are different: D≠D' in terms of the occurrence of the data, for example the target distribution comprises the same images, but they are corrupted with noise. Said loss function can help avoiding test-time adaptation collapsing to too narrow distributions such as always predicting the same or very few classes.

Assuming knowledge of the class distribution $p_{D'}(y)$ on the target domain D', it is proposed to add a term to the loss that encourages the empirical distribution of (soft) predictions of the pretrained network on X to match this distribution $p_{D'}(y)$.

Specifically, let $\hat{p}_g(y)$ be an estimate of the distribution of (soft) predictions of the pretrained network. The Kullback-Leibler divergence $L_{div}=D_{KL}(\hat{p}_g(y)\|p_{D'}(y))$ can be used as loss term, describing the difference between the two distributions. Other alternatives to KL are total variation distance, Hellinger distance and earth mover's distance. We used KL because of its simplicity for measuring the divergence between two distributions.

Since the estimated distribtion $\hat{p}_g(y)$ depends on the parameter of the pretrained network φ and is continuously adapted, it needs to be re-estimated on a per-batch level. Since re-estimating $\hat{p}_g(y)$ from scratch would be computational expensive. Instead, it is proposed to use a running estimate that tracks the changes of φ as follows: let $p_{t-1}(y)$ be the estimated distribution at iteration t−1 and $$p^{emp} = \frac{1}{n}\Sigma_{k=1}^{n}\hat{y}^{(k)},$$

where $\hat{y}^{(k)}$ are the predictions (confidences) of the pretrained model on a mini-batch of n inputs $x^{(k)} \sim X$ from the target distribution. The running average can be updated via: $p_t(y) = \kappa \cdot p_{t-1}(y)+(1-\kappa) \cdot p_t^{emp}$. Preferably, κ equals 0.9. Then, the first loss function is defined as follows:

$$L_{div}=D_{KL}(p_t(y)\|p_{D'}(y)) \quad \text{(eq. 1):}$$

It is noted that the target distribution $p_{D'}(y)$ can be chosen a prior as uniform distribution, wherein all classes are expected to occur equally distributed. If it is obvious that the some classes of the target distribution occur more often, then the expected occurrence of these classes can be increase in the target distribution $p_{D'}(y)$.

The second embodiment relates to a second loss function, which can be called 'Confidence Maximation' loss function. The second loss function is characterized by the property that said loss function encourages high confidence prediction on individual data points.

In the case of labels being available for the target domain (which is for the present invention not required) in the form of a one-hot encoded reference $y_t$ for data $x_t$, one could use the supervised cross-entropy loss by setting a reference $y^r=y_t$ and using a loss $L_{sup}(\hat{y}; y^r)=H(\hat{y}; y^r)=H(\hat{y}; y_t)=-\Sigma_c y_t \log \hat{y}$ for the desired adaptation. Since fully test-time adaptation assumes no label information being available, the supervised cross-entropy loss is not applicable and other options for $y^r$ need to be used. In the following, two preferred option are proposed for the reference outputs $y^r$.

One option are hard pseudo-labels. That is, one defines the reference $y^r$ based on the network predictions $y_t$ via $y^r=\text{onehot}(\hat{y})$, where onehot( ) creates a one-hot reference with the 1 corresponding to the class c with maximal confidence in $\hat{y}$ and 0 for the other classes.

Another option is to use soft pseudo-labels, that is: $y^r=\hat{y}$.

While both hard and soft pseudo-labels are clearly motivated, they are not optimal in conjunction with a gradient-based optimizer since the self-supervision from low confidence predictions dominates (at least during later stages of training). To address this issue, it is proposed to build the second loss function analogous to the above described loss function $L_{sup}$, however the second loss function is not based on the cross-entropy H, but instead on the negative log likelihood ratios R:

$$R(\hat{y}; y^r) = -\sum_c y_c^r \log\left(\hat{y}_c / \sum_{i \neq c} \hat{y}_i\right) \quad \text{(eq. 2)}$$

While the entropy H is lower bounded by 0, R can get arbitrary small if $y_c^r$ tends towards 1. This property advantageously induces non-vanishing gradients for high confidence predictions.

Inserting the hard likelihood ratio into the equation for the lo likelihood rations, a hard likelihood ratio loss can be defined as:

$$L_{hlr}(\hat{y}) = R(\hat{y}; \text{onehot}(\hat{y})) = -\log\left(\hat{y}_c / \sum_{i \neq c} \hat{y}_i\right) \quad \text{(eq. 3)}$$

Assuming that the last layer of the pretrained network is a softmax layer, the output is given as $\hat{y}=\text{softmax}(o)$, where o are the network's logits, then the loss function $L_{hlr}(\hat{y})$ can be rewritten:

$$L_{hlr}(\hat{y}) = R(\hat{y}; \text{onehot}(\hat{y})) = -o_{c^*} + \log \sum_{i \neq c^*} e^{o_i} \quad \text{(eq. 4)}$$

with $c^*=\text{argmax}[\hat{y}]$ and e is the Euler number.

In order to account for uncertainty in network predictions during self-labelling in a similar way as for the entropy loss, also a soft likelihood ratio loss is proposed as follows:

$$L_{slr}(\hat{y}) = R(\hat{y}; \hat{y}) = -\sum_c \hat{y}_c \cdot \log\left(\hat{y}_c / \sum_{i \neq c} \hat{y}_i\right) \quad \text{(eq. 5)}$$

This equation can be rewritten for a softmax output layer as follows:

$$L_{slr}(\hat{y}) = R(\hat{y}; \hat{y}) = \sum_c \hat{y}_c(-o_c + \log \sum_{i \neq c^*} e^{o_i}) \quad \text{(eq. 6)}$$

In a preferred embodiment, both loss functions are utilized in combination: $L=L_{div}+\delta L_{conf}$, wherein $\delta$ is a scaling factor and $L_{conf}$ is $L_{hlr}$ or/and $L_{slr}$.

The proposed loss functions could also be directly used for tasks such as semantic segmentations by applying the losses pixel-wise.

FIG. 1 shows schematically a flowchart of a method for adjusting the trained network for the target distribution, wherein the above proposed loss functions can be used.

The depicted method of FIG. 1 starts with step S11. In step S 11 a pretrained network is received. Alternatively, instead of receiving an already pre-trained network, the network can be a trained in step S 11 on training data from a source distribution D. The training data can be images captured in a first manufacturing plant.

After step S 11 has been terminated, the following step S12 is carried out. In this step, data samples from the target distribution D' are received. Alternatively, it is possible to collect sensor data from the target the distribution D'. Data from the target distribution can be images captured in a second manufacturing plant. It is also possible that said data is acquired with a different camera setting than the training data images. It is beneficial to have larger number of data samples from the target distribution. However, significant improvements can be seen even using the small number of data samples, e.g. Network trained on 1.2M training data samples shown siginificant improvements when adapted on the target data distribution with minimum of 5000 data samples.

Afterwards, step S13 follows. In this step, the network obtained by step S11 is adapted to the received (sensor) data of step S 2. In step S13 parameters of the pretrained network are adapted in the such a way that the first loss function or the second loss function or a combination of both loss functions are minimized, e.g. by gradient descent.

During training with one of the second loss functions $(L_{slr}, L_{hlr})$, it has been shown that it is beneficial freezing the top layers of the network. In this case, normalization layers such as batch normalization prohibit "logit explosion" due to the second loss function. Similar to Wong et al, mentioned above, preferably only the a subset of parameters of the pre-trained network are optimized during step S13.

Step S13 can be repeated for several batches of the precise the sensor data is often step S12. Additionally it is also possible to repeat step S13 for several epochs.

After the adaption of the pretrained network by step S13 has been terminated, the subsequent optional step S14 is carried out. In this step the adjusted network of step S13 is transferred to a given application. This can be for example the case where the adapted network of step S13 is utilized for the second manufacturing plant. After adapting the pre-trained network to the collected sensor data off the second manufacturing plant, the adjusted neural network is transferred to the second manufacturing plant. This can happen for example by downloading the adapted network to the second manufacturing plant.

If the adjusted network has been transferred to the second manufacturing plant, in the subsequent step S15, the transferred network is applied according to its predefined task for which it has been pretrained. Exemplarily, the adjusted network can receive sensor data are collected from our current production process of the second manufacturing plant, an actuator of the second manufacturing plant is controlled depending on the output of the transferred network. It is noted that the actuator can be also given for other applications. The FIG. 3 and following show examples of other applications with an actuator, for which the adjusted network can be applied.

The method is then terminated.

In a further embodiment, an input transformation module for the pretrained network is proposed. The motivation for the additional component is to increase expressivity of g such that it can learn to (partially) undo the domain shift (D→D').

The input transformation module can be defined as follows:

$$d)x)=\gamma \cdot [\tau x+(1-\tau)r_\psi(x)]+\beta \quad (eq.7):$$

where $\tau \in R$ and $\beta, \gamma \in R^{n_i}$, where $n_i$ being the number of input channels and $r_\psi$ being a network with identical input and output shape, and $(\cdot)$ denoting elementwise multiplication. Specifically, $\beta$ and $\gamma$ implement a channel-wise affinetransformation and $\tau$ implements a convex combination of unchanged input and the transformed input by $r_\psi$.

By choosing $\beta=0$ and $\gamma=1$ and $\tau=1=0$, we ensure $d(x)=x$ at initialization. In principle, $r_\psi$ can be chosen arbitrarily. Preferably, $\beta_\psi$ is as a simple stack of 3×3 convolutions, group normalization, and ReLUs. Other embodiments are possible with more complex transformations $r_\psi$.

The parameters of the input transformation module and parameters of the pretrained network can be referred to as modulation parameters $\phi=(\beta,\gamma,\tau,\psi,\theta')$, wherein $\theta'$ are a subset parameters of the pretrained network. That is, one can adapt only a subset of the parameters $\theta$ of the pretrained network $f_\theta$. More precisely, in adapting only the affine parameters of normalization layers of the pretrained network while keeping parameters of convolutional kernels or other weights unchanged. Additionally, batch normalization statistics (if any) are adapted to the target distribution.

Please note that the proposed method is applicable to any pretrained network that contains normalization layers with a channel-wise affine transformation. Even for networks that do not come with such affine transformation layers, one can add affine transformation layers into f that are initialized to identity as part of model augmentation.

Figure 2A:
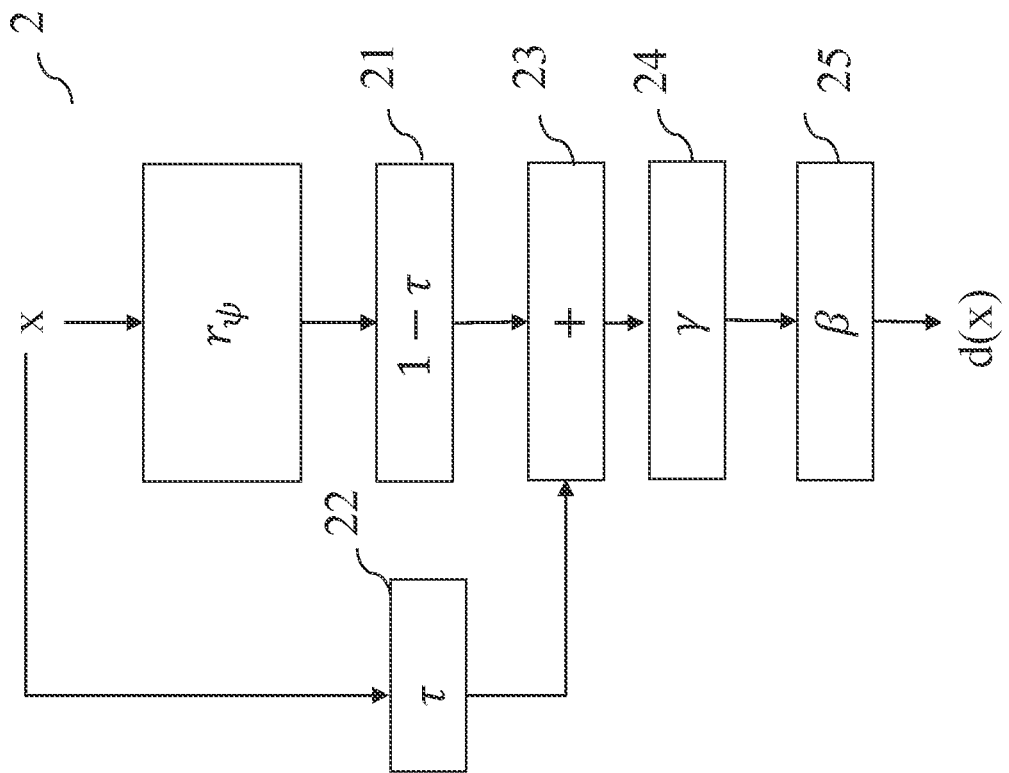

FIG. 2A shows exemplarily the input transformation module 2, which preprocesses input data for the pretrained network 26. The input sample x is forwarded to a further network $r_\psi$ as well as to modul 22, which weights the input by multiplying it with a factor $\tau$.

The output of the further network $r_\psi$ is weightend by the factor if $1-\tau$ by module 21. Both weighted outputs are then forwarded to module 23. Module 23 sums up both weighted output and forward the sum to module 24. Module 24 multiplies the output of module 23 by $\gamma$. In the last modul 25, an offset $\beta$ is added to the result of moudl 24 and outputted as d(x).

FIG. 2B shows the arrangement of the input transformation module 2 with respect to the pretrained network 26. The input transformation module is connect to the input of the pretrained machine learning model. The combination of input transformation module 2 and the pretrained network 26 is an augmented machine learning system (3).

In addition to FIG. 1, it is possible to add a sub step between S11 and S12 or between S12 and S13 before optimizing the pretrained network.

This sub step can comprise a modification of the pretrained network by connection the input transformation module 2 according to FIG. 2B before the pretrained network.

In the subsequent optimization step S13, the parameter $\phi$ or only the parameter of the input transformation module 2 are optimized.

Figure 3:
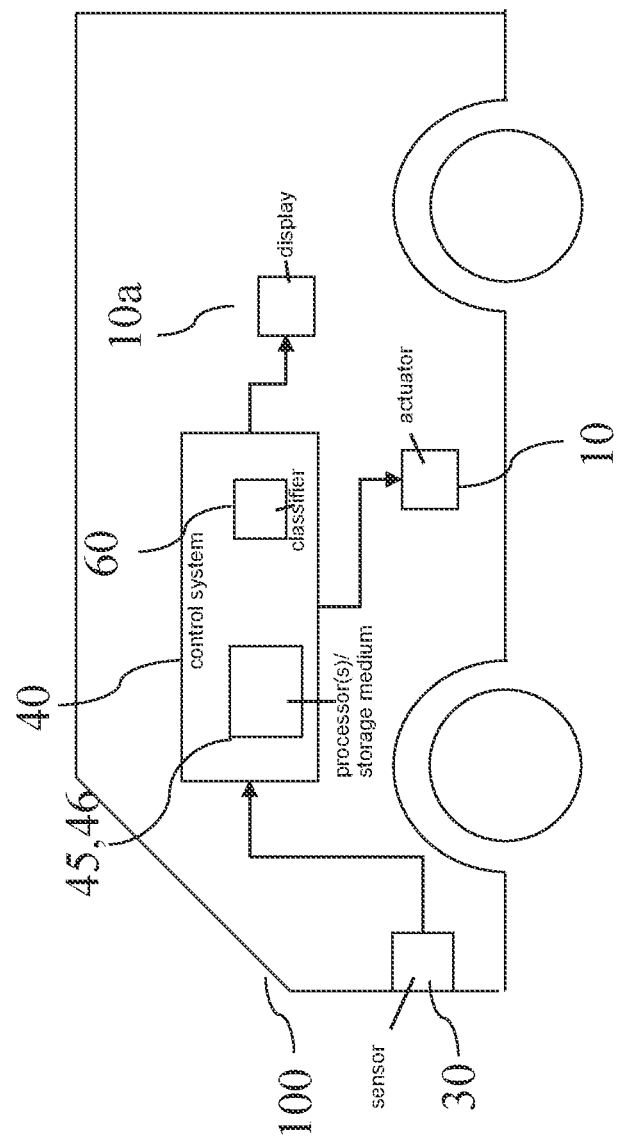
FIG. 3 shows the control system controlling an at least partially autonomous robot, in accordance with an example embodiment of the present invention.

Shown in FIG. 3 is one embodiment of an actuator 10, which can be controlled depending on determined outputs of the adjusted network according to FIG. 1. Actuator 10 interacts with a control system 40. At preferably evenly spaced distances, a sensor 30 senses a condition of the actuator system. The sensor 30 may comprise several sensors. Preferably, sensor 30 is an optical sensor that takes images of an environment. An output signal S of sensor 30 (or, in case the sensor 30 comprises a plurality of sensors, an output signal S for each of the sensors) which encodes the sensed condition is transmitted to the control system 40.

Thereby, control system 40 receives a stream of sensor signals S. It then computes a series of actuator control commands A depending on the stream of sensor signals S, which are then transmitted to actuator 10.

Control system 40 receives the stream of sensor signals S of sensor 30 in the optional input transformation module 2, which is not shown in FIG. 3. Input transformation module preprocesses the sensor signals S into input signals x. Alternatively, in case of no input transformation module, each sensor signal S may directly be taken as an input signal x. Input signal x may, for example, be given as an excerpt from sensor signal S. Input signal x comprises image data corresponding to an image recorded by sensor 30. In other words, input signal x is provided in accordance with sensor signal S.

Input signal x is then passed on to the adjusts network, which is in this embodiment an image classifier 60.

Classifier 60 determines output signals y from input signals x.

The output signal y comprises information that assigns one or more labels to the input signal x. Output signals y are transmitted to an optional conversion unit 80, which converts the output signals y into the control commands A. Actuator control commands A are then transmitted to actuator 10 for controlling actuator 10 accordingly. Alternatively, output signals y may directly be taken as control commands A.

Actuator 10 receives actuator control commands A, is controlled accordingly and carries out an action corresponding to actuator control commands A. Actuator 10 may comprise a control logic which transforms actuator control command A into a further control command, which is then used to control actuator 10.

In further embodiments, control system 40 may comprise sensor 30. In even further embodiments, control system 40 alternatively or additionally may comprise actuator 10.

In one embodiment classifier 60 may be designed to identify lanes on a road ahead, e.g. by classifying a road surface and markings on said road, and identifying lanes as patches of road surface between said markings. Based on an output of a navigation system, a suitable lane for pursuing a chosen path can then be selected, and depending on a present lane and said target lane, it may then be decided whether vehicle 60 is to switch lanes or stay in said present lane.

Control command A may then be computed by e.g. retrieving a predefined motion pattern from a database corresponding to said identified action.

Likewise, upon identifying road signs or traffic lights, depending on an identified type of road sign or an identified state of said traffic lights, corresponding constraints on possible motion patterns of vehicle 60 may then be retrieved from e.g. a database, a future path of vehicle 60 commensurate with said constraints may be computed, and said actuator control command A may be computed to steer the vehicle such as to execute said trajectory.

Likewise, upon identifying pedestrians and/or vehicles, a projected future behavior of said pedestrians and/or vehicles may be estimated, and based on said estimated future behavior, a trajectory may then be selected such as to avoid collision with said pedestrian and/or said vehicle, and said actuator control command A may be computed to steer the vehicle such as to execute said trajectory.

In still further embodiments, it may be envisioned that control system 40 controls a display 10a instead of an actuator 10.

Furthermore, control system 40 may comprise a processor 45 (or a plurality of processors) and at least one machine-readable storage medium 46 on which instructions are stored which, if carried out, cause control system 40 to carry out a method according to one aspect of the present invention.

In an preferred embodiment, the control system 40 is used to control an at least partially autonomous robot, e.g. an at least partially autonomous vehicle 100.

Sensor 30 may comprise one or more video sensors and/or one or more radar sensors and/or one or more ultrasonic sensors and/or one or more LiDAR sensors and or one or more position sensors (like e.g. GPS). Some or all of these sensors are preferably but not necessarily integrated in vehicle 100.

Alternatively or additionally sensor 30 may comprise an information system for determining a state of the actuator system. One example for such an information system is a weather information system which determines a present or future state of the weather in environment 20.

For example, using input signal x, the classifier 60 may for example detect objects in the vicinity of the at least partially autonomous robot. Output signal y may comprise an information which characterizes where objects are located in the vicinity of the at least partially autonomous robot. Control command A may then be determined in accordance with this information, for example to avoid collisions with said detected objects.

Actuator 10, which is preferably integrated in vehicle 100, may be given by a brake, a propulsion system, an engine, a drivetrain, or a steering of vehicle 100. Actuator control commands A may be determined such that actuator (or actuators) 10 is/are controlled such that vehicle 100 avoids collisions with said detected objects. Detected objects may also be classified according to what the classifier 60 deems them most likely to be, e.g. pedestrians or trees, and actuator control commands A may be determined depending on the classification.

In further embodiments, the at least partially autonomous robot may be given by another mobile robot (not shown), which may, for example, move by flying, swimming, diving or stepping. The mobile robot may, inter alia, be an at least partially autonomous lawn mower, or an at least partially autonomous cleaning robot. In all of the above embodiments, actuator command control A may be determined such that propulsion unit and/or steering and/or brake of the mobile robot are controlled such that the mobile robot may avoid collisions with said identified objects.

In a further embodiment, the at least partially autonomous robot may be given by a gardening robot (not shown), which uses sensor 30, preferably an optical sensor, to determine a state of plants in the environment 20. Actuator 10 may be a nozzle for spraying chemicals. Depending on an identified species and/or an identified state of the plants, an actuator control command A may be determined to cause actuator 10 to spray the plants with a suitable quantity of suitable chemicals.

In even further embodiments, the at least partially autonomous robot may be given by a domestic appliance (not shown), like e.g. a washing machine, a stove, an oven, a microwave, or a dishwasher. Sensor 30, e.g. an optical sensor, may detect a state of an object which is to undergo processing by the household appliance. For example, in the case of the domestic appliance being a washing machine, sensor 30 may detect a state of the laundry inside the washing machine. Actuator control signal A may then be determined depending on a detected material of the laundry.

Figure 4:
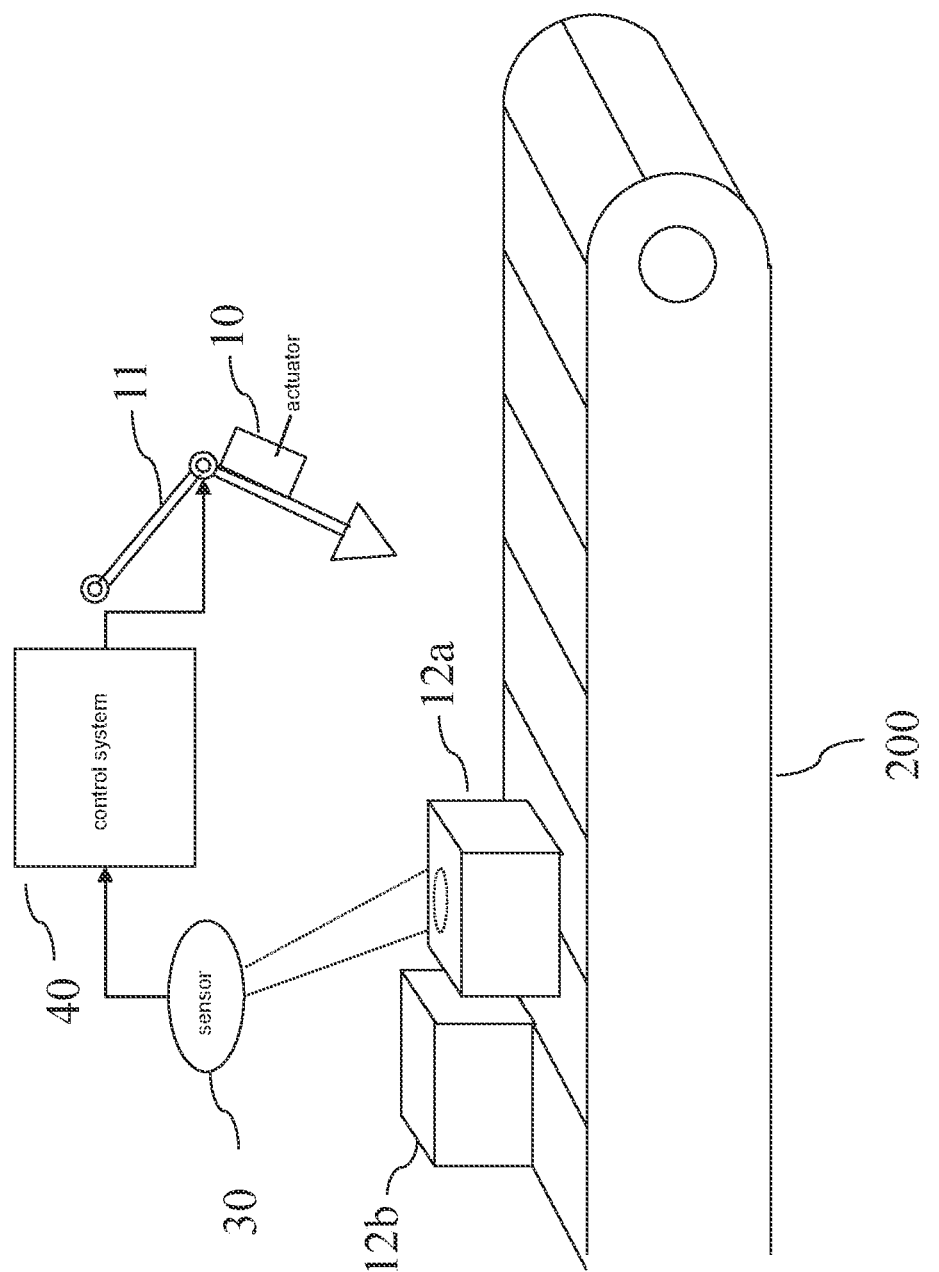
FIG. 4 shows the control system controlling a manufacturing machine, in accordance with an example embodiment of the present invention.

Shown in FIG. 4 is an embodiment in which control system 40 is used to control a manufacturing machine 11, e.g. a punch cutter, a cutter or a gun drill) of a manufacturing system 200, e.g. as part of a production line. The control system 40 controls an actuator 10 which in turn control the manufacturing machine 11. Sensor 30 may be given by an optical sensor which captures properties of e.g. a manufactured product 12. Classifier 60 may determine a state of the manufactured product 12 from these captured properties. Actuator 10 which controls manufacturing machine 11 may then be controlled depending on the determined state of the manufactured product 12 for a subsequent manufacturing step of manufactured product 12. Or, it may be envisioned that actuator 10 is controlled during manufacturing of a subsequent manufactured product 12 depending on the determined state of the manufactured product 12.

Figure 5:
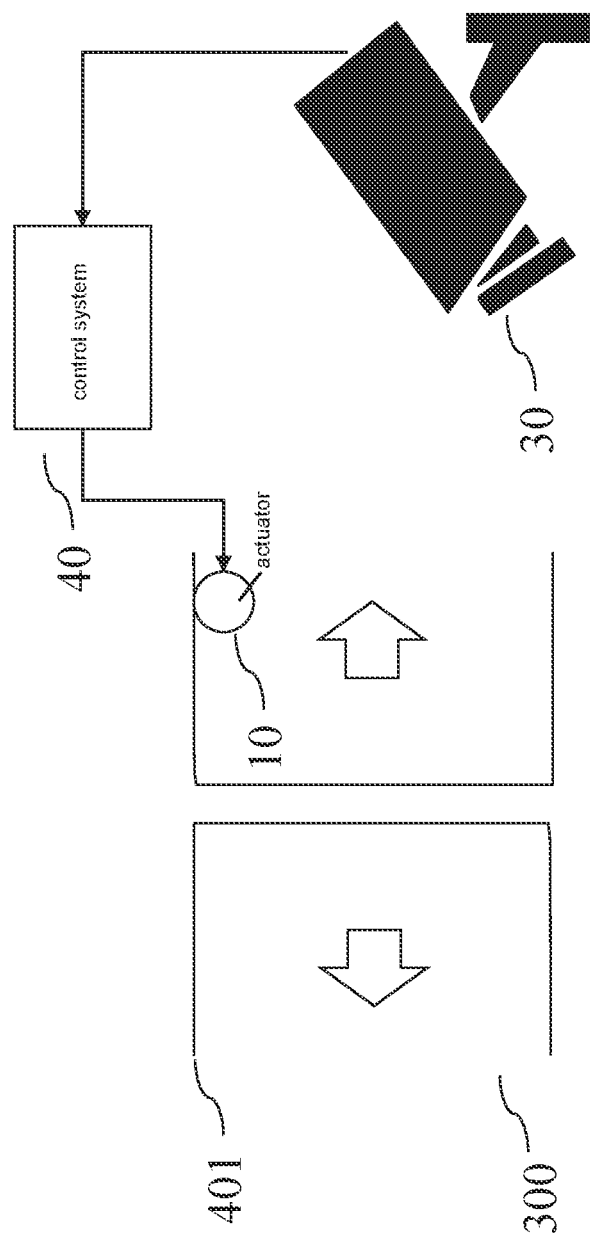
FIG. 5 shows the control system controlling an access control system, in accordance with an example embodiment of the present invention.

Shown in FIG. 5 is an embodiment in which control system controls an access control system 300. Access control system may be designed to physically control access. It may, for example, comprise a door 401. Sensor 30 is configured to detect a scene that is relevant for deciding whether access is to be granted or not. It may for example be an optical sensor for providing image or video data, for detecting a person's face. Classifier 60 may be configured to interpret this image or video data e.g. by matching identities with known people stored in a database, thereby determining an identity of the person. Actuator control signal A may then be determined depending on the interpretation of classifier 60, e.g. in accordance with the determined identity. Actuator 10 may be a lock which grants access or not depending on actuator control signal A. A non-physical, logical access control is also possible.

Figure 6:
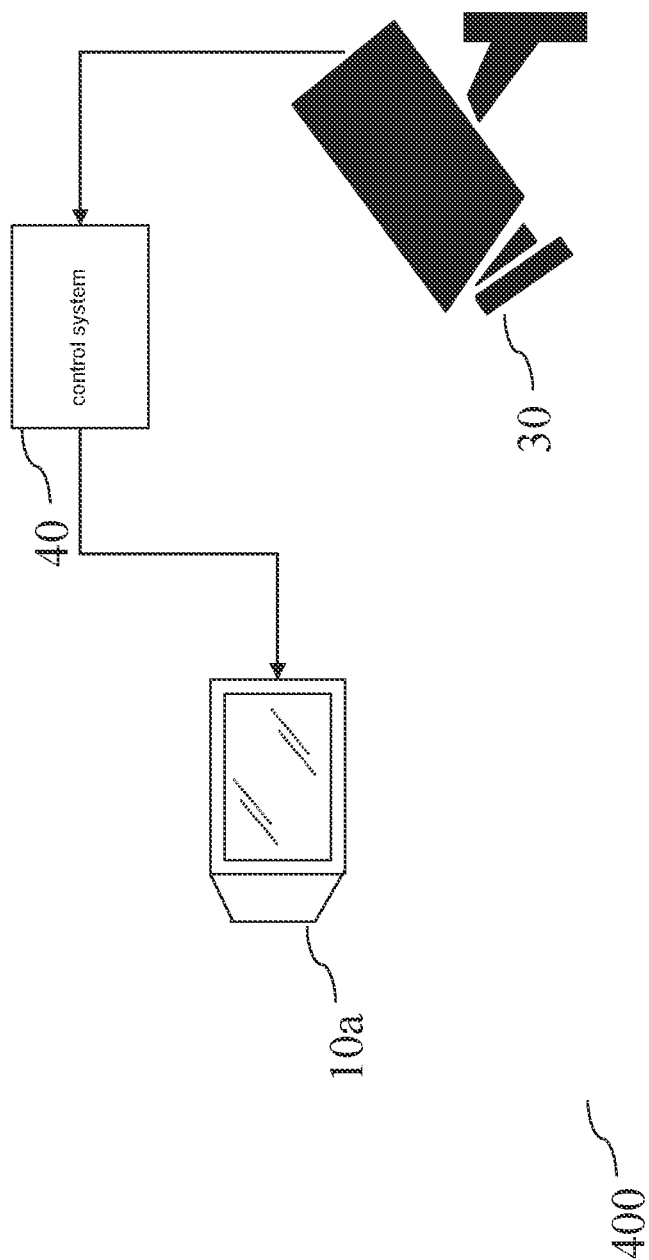
FIG. 6 shows the control system controlling a surveillance system, in accordance with an example embodiment of the present invention.

Shown in FIG. 6 is an embodiment in which control system 40 controls a surveillance system 400. This embodiment is largely identical to the embodiment shown in FIG. 5. Therefore, only the differing aspects will be described in detail. Sensor 30 is configured to detect a scene that is under surveillance. Control system does not necessarily control an actuator 10, but a display 10a. For example, the machine learning system 60 may determine a classification of a scene, e.g. whether the scene detected by optical sensor 30 is suspicious. Actuator control signal A which is transmitted to display 10a may then e.g. be configured to cause display 10a to adjust the displayed content dependent on the determined classification, e.g. to highlight an object that is deemed suspicious by machine learning system 60.

Figure 7:
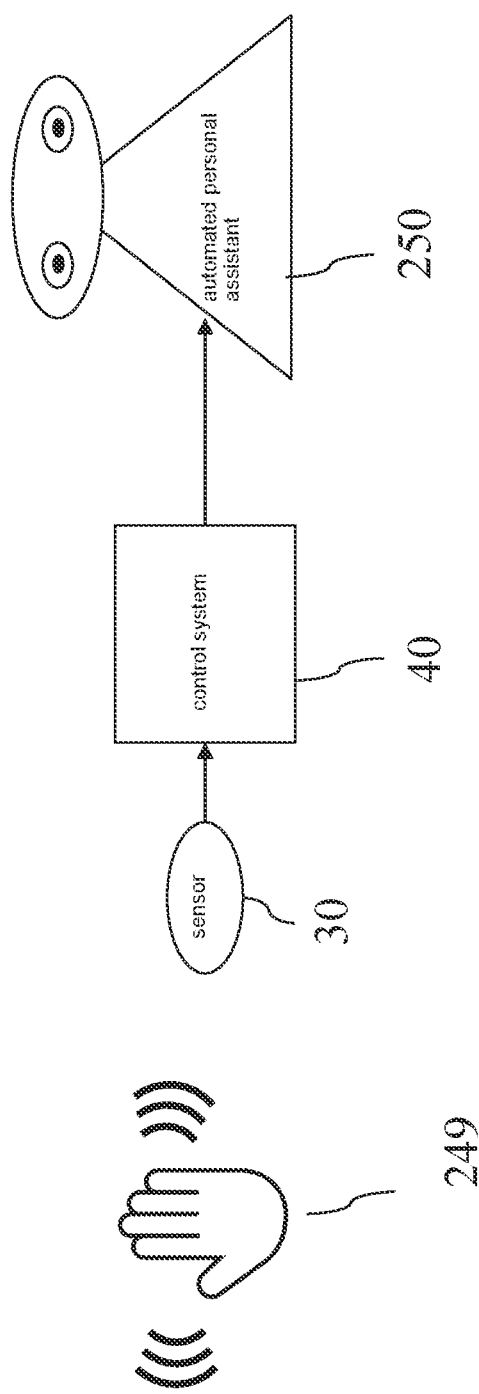
FIG. 7 shows the control system controlling an automated personal assistant, in accordance with an example embodiment of the present invention.
Figure 8:
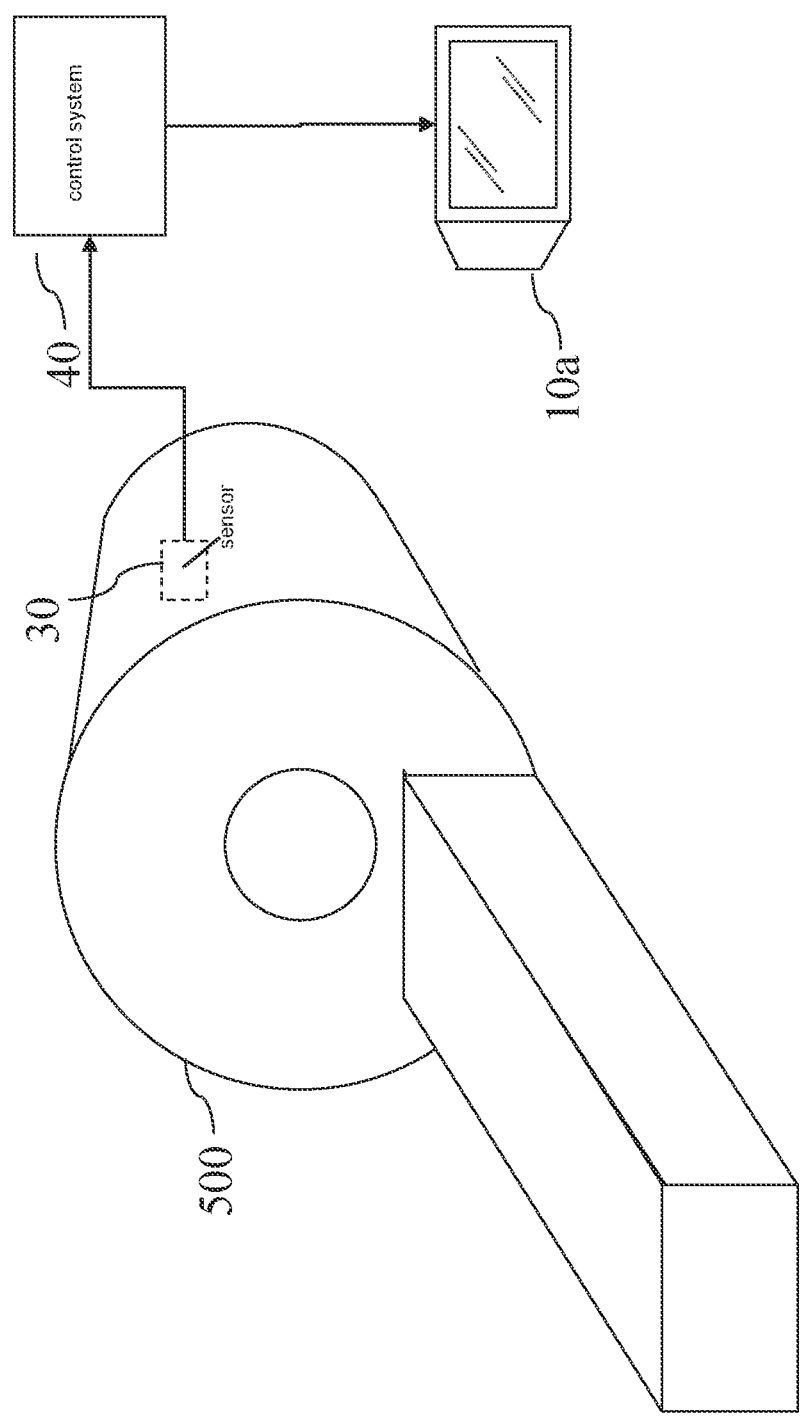
FIG. 8 shows the control system controlling an imaging system, in accordance with an example embodiment of the present invention.

Shown in FIG. 7 is an embodiment in which control system 40 is used for controlling an automated personal assistant 250. Sensor 30 may be an optic sensor, e.g. for receiving video images of a gestures of user 249. Alternatively, sensor 30 may also be an audio sensor e.g. for receiving a voice command of user 249.

Control system 40 then determines actuator control commands A for controlling the automated personal assistant 250. The actuator control commands A are determined in accordance with sensor signal S of sensor 30. Sensor signal S is transmitted to the control system 40. For example, classifier 60 may be configured to e.g. carry out a gesture recognition algorithm to identify a gesture made by user 249. Control system 40 may then determine an actuator control command A for transmission to the automated personal assistant 250. It then transmits said actuator control command A to the automated personal assistant 250.

For example, actuator control command A may be determined in accordance with the identified user gesture recognized by classifier 60. It may then comprise information that causes the automated personal assistant 250 to retrieve information from a database and output this retrieved information in a form suitable for reception by user 249.

In further embodiments, it may be envisioned that instead of the automated personal assistant 250, control system 40 controls a domestic appliance (not shown) controlled in accordance with the identified user gesture. The domestic appliance may be a washing machine, a stove, an oven, a microwave or a dishwasher.

Shown in FIG. 7 is an embodiment of a control system 40 for controlling an imaging system 500, for example an MRI apparatus, x-ray imaging apparatus or ultrasonic imaging apparatus. Sensor 30 may, for example, be an imaging sensor. Machine learning system 60 may then determine a classification of all or part of the sensed image. Actuator control signal A may then be chosen in accordance with this classification, thereby controlling display 10*a*. For example, machine learning system 60 may interpret a region of the sensed image to be potentially anomalous. In this case, actuator control signal A may be determined to cause display 10*a* to display the imaging and highlighting the potentially anomalous region.

Figure 9:
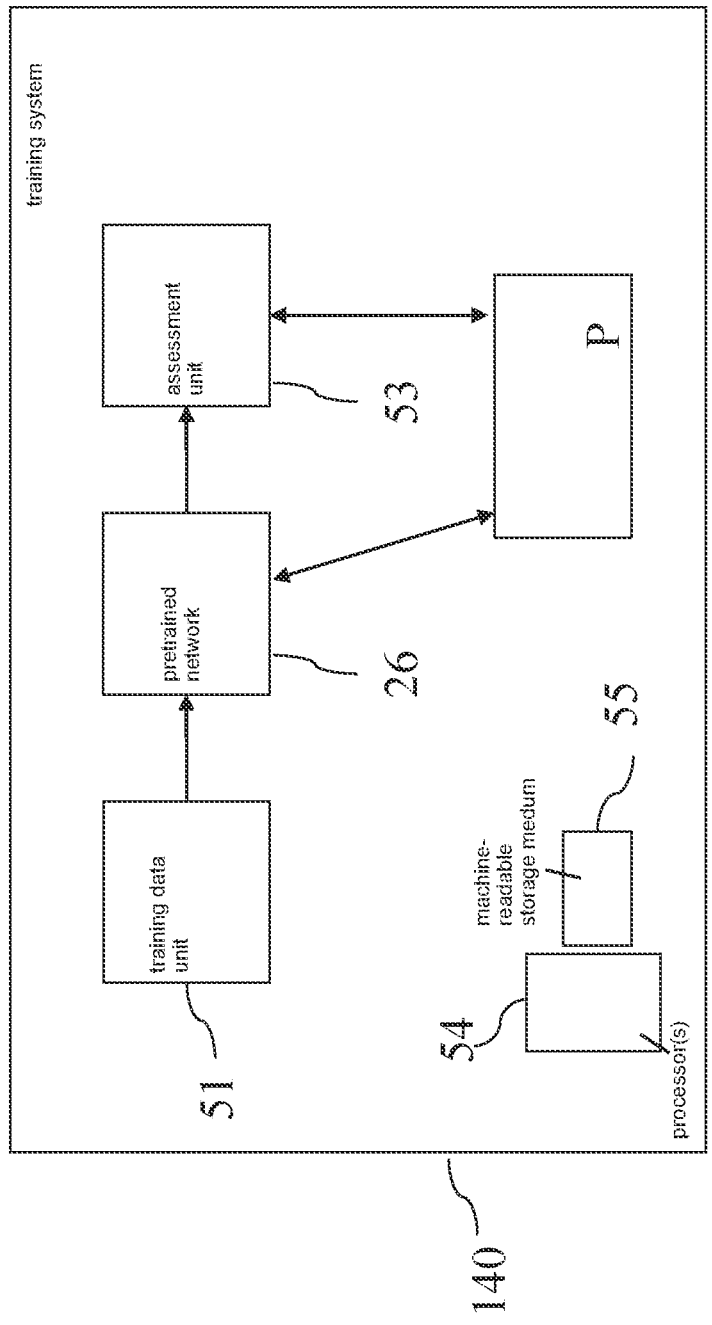
FIG. 9 shows a training system for controlling the classifier, in accordance with an example embodiment of the present invention.

Shown in FIG. 9 is an embodiment of a training system 140 for adjusting the pretrained network 26 and/or the input transformation module 2. A training data unit 51 determines input signals x, which are passed on to the pretrained network 26. For example, training data unit 150 may access a computer implemented database $St_2$ in which a set X of training data is stored. Set X comprises of input signals $x_i$.

The pretrained network 26 is configured to compute output signals from input signal $x_i$. These output signals are also passed on to assessment unit 53.

Assessment unit 53 determines updated parameters depending on input from assessment unit according to the method described in FIG. 1. Updated parameters are transmitted to parameter storage $St_1$ to replace present parameters.

Furthermore, training system 140 may comprise a processor 54 (or a plurality of processors) and at least one machine-readable storage medium 55 on which instructions are stored which, if carried out, cause control system 140 to carry out a method according to one aspect of the present invention.

If processor 54 is a GPU with tensor cores capable of performing rapid half-precision calculations (i.e. faster than full-precision calculations), preferably the above method is carried out using mixed-precision arithmetic which provides significant speed-up.

The term "computer" covers any device for the processing of pre-defined calculation instructions. These calculation instructions can be in the form of software, or in the form of hardware, or also in a mixed form of software and hardware.

It is further understood that the procedures cannot only be completely implemented in software as described. They can also be implemented in hardware, or in a mixed form of software and hardware.

What is claimed is:

1. A computer implemented augmented machine learning system, comprising:
   a parameterized input transformation module; and
   a pretrained learning system configured to classify images;
   wherein an output of the parameterized input transformation module is connected with an input of the pretrained machine learning system, and the input transformation module is configured to at least linearly transform its input, and further configured to input its transformed input to the pretrained machine learning system;
   wherein the input transformation module is configured to at least partially undo a domain shift of inputs of the input transformation module such that outputs of the input transformation module come relatively close to an original input of a training data distribution on which the pretrained machine learning system has been trained;
   wherein the input transformation module includes a further machine learning system which is connected in series with a linear transformation module, the further machine learning system being configured to non-linearly transform the input of the input transformation module,
   wherein the linear transformation module is configured to linearly transform its input depending on parameters characterizing a linear transformation, and
   wherein between the further machine learning system and the linear transformation module, an addition module is interconnected, and the addition module includes at least two inputs, and a first input of the at least two inputs is configured to receive outputs of the further machine learning system and a second input of the at least two inputs is configured to receive the input of the input transformation module, and the addition module is configured to weighted sum its inputs and output the sum to the linear transformation module.

2. The machine learning system according to claim 1, wherein the output of the input transformation module has the same dimensions/shape as the input of the input transformation module.

3. The machine learning system according to claim 1, wherein the further machine learning system is a neural network, which includes at least a convolution layer, a normalization layer and a layer with ReLU's.

4. A computer implemented method for parametrizing an input transformation module, comprising the following steps:
   receiving a pretrained machine learning system and a plurality of samples from a second dataset;
   connecting the input transformation module output with an input of the pretrained machine learning system;
   receiving a plurality of samples from the second dataset;
   estimating a first distribution of expected labels of the received samples;

determining outputs for each sample of a subset of the received samples by the pretrained machine learning system connected with the input transformation module;

estimating a second distribution of labels depending on the determined outputs of the machine learning system;

determining a first loss function which characterizes a divergence between the first distribution and the second distribution, wherein the first loss function depends on parameters of at least the input transformation module and of the machine learning system, wherein the divergence of the first loss function is a Kullback-Leibler divergence between the first and second distribution, and wherein the second distribution is iteratively determined by a moving average over the outputs determined so far; and adjusting the parameters of at least the input transformation module and of the machine learning system such that the first loss function decreases.

5. The method according to claim 4, wherein the first distribution is a uniform distribution of an occurrence of classes of the first training data.

6. The method according to claim 4, wherein a second loss function is determined, wherein the second loss function characterizes a negative log-likelihood ratio between the outputs of the pretrained machine learning system and pseudo labels, wherein the pseudo labels are estimated depending on the outputs of the machine learning system for a current subset of received samples, wherein the parameters of at least the input transformation module and of the machine learning system are adjusted either to decrease the first or second loss function or to decease both the first and second loss function, and wherein the pseudo labels are a one hot-encoding of the outputs of the machine learning system or the pseudo labels are the outputs of the machine learning system.

7. The method according to claim 4, wherein the parameters of the input transformation module are initialized in such a way that the input transformation module carries out an identity mapping of its input for the pretrained machine learning system.

8. The method according to claim 4, wherein during the adjusting, affine parameters of normalization layers of the pretrained machine learning system are adapted.

9. The method according to claim 4, wherein the pretrained machine learning system is a classifier for classifying input signals obtained from a sensor.

10. A non-transitory machine-readable storage medium on which is stored a computer program for parametrizing an input transformation module, the computer program, when executed by a processor, causing the processor to perform the following steps:

receiving a pretrained machine learning system and a plurality of samples from a second dataset;

connecting the input transformation module output with an input of the pretrained machine learning system;

receiving a plurality of samples from the second dataset;

estimating a first distribution of expected labels of the received samples;

determining outputs for each sample of a subset of the received samples by the pretrained machine learning system connected with the input transformation module;

estimating a second distribution of labels depending on the determined outputs of the machine learning system;

determining a first loss function which characterizes a divergence between the first distribution and the second distribution, wherein the first loss function depends on parameters of at least the input transformation module and of the machine learning system, wherein the divergence of the first loss function is a Kullback-Leibler divergence between the first and second distribution, and wherein the second distribution is iteratively determined by a moving average over the outputs determined so far; and adjusting the parameters of at least the input transformation module and of the machine learning system such that the first loss function decreases.

* * * * *